United States Patent [19]

Jonsson et al.

[11] Patent Number: 4,856,101
[45] Date of Patent: Aug. 8, 1989

[54] APPARATUS FOR DIVERTING ELECTROSTATIC FIELDS, FOR INSTANCE FROM TELEVISION VIEWING SCREENS

[75] Inventors: Sven Jonsson, Vimmerby; Anders Hagman, Vastervik, both of Sweden

[73] Assignee: Jonson Teknik KB, Vimmerby, Sweden

[21] Appl. No.: 134,338

[22] Filed: Dec. 17, 1987

[30] Foreign Application Priority Data

Dec. 17, 1986 [SE] Sweden .............................. 8605423
Jan. 30, 1987 [SE] Sweden .............................. 8700374

[51] Int. Cl.$^4$ ......................... H04N 5/72; H04N 5/65
[52] U.S. Cl. ..................... 358/245; 358/253; 428/435
[58] Field of Search ............... 358/245, 253; 430/28, 430/23, 24; 428/426, 435, 432

[56] References Cited

U.S. PATENT DOCUMENTS

| | | | |
|---|---|---|---|
| 4,076,371 | 2/1978 | Braun et al. | 428/435 |
| 4,514,585 | 4/1985 | Paynton | 358/245 |
| 4,686,576 | 8/1987 | Dickie et al. | 358/253 |

Primary Examiner—Edward L. Coles, Sr.
Assistant Examiner—Kim Yen Vu

[57] ABSTRACT

A method and an apparatus for reducing of and diverting radiation from all kinds of radiation emitting surfaces like viewing screens, TV screens, chassis, apparatus boxes etc. whereby an elecrically conducting current diverting means (11), for instance a coil of stainless steel, is applied in direct contact with the radiation emitting surface (9) and is connected to earth (12), and whereby a fluid layer containing film or foil or a mass is applied directly to the radiation emitting surface (9) and the diverting means (11), said fluid layer or mass comprising a salt of electrolytic type, and in which the mass is of the type which forms a surface skin or becomes dried right through when being exposed to air, and said layer or mass being electrically conducting even in such dried state, and whereby the apparatus is ready for being used when said mass has formed a skin or has become dried. The current diverting means can be applied after the application of the electrolytic layer or mass. The fluid layer or covering mass preferably is a salt of an acid and an alkali metal or calcium, for instance sodium or potassium lauryl ether sulphate or calcium lauryl ether sulphate.

15 Claims, 2 Drawing Sheets

APPARATUS FOR DIVERTING ELECTROSTATIC FIELDS, FOR INSTANCE FROM TELEVISION VIEWING SCREENS

By radiation emitting objects are meant, in this case, many different types of electric and electronic apparatus and instruments which produce radiation of the said type, for instance viewing screens of television tubes or computer monitor tubes, copying machines, discharge tubes, several apparatus having corona wires, etc.

The method and the apparatus are in the first place intended to be used in connection to viewing screens of television tubes and cathode ray tubes, but said method and apparatus can be utilized as well on chassis, casings and other outer shells of the radiation producing apparatus. In the following the invention will, however and without any limitation of the invention, be described mainly with reference to cathode ray tubes and monitor tubes.

Many people are troubled by radiation and discharges from many different modern apparatus and also from older machines and apparatus. Many attempts have been made to reduce and to divert such electromagnetic radiation. For instance, protection screens have been made intended to be applied in front of the viewing screen of the cathode ray tube or the monitor tube, but such screens have often been difficult to mount; it may be difficult to keep the screens clean and free from dust; the screen may obstruct the cleaning of the monitor viewing screen, etc.; they can prejudice the visability of the monitor viewing screen; if considered troublesome they can easily be removed; they are often expensive; they may not fit the viewing screen of the monitor tube; radiation may leak between the viewing screen of the monitor and the protection screen or aside thereof etc. Also, such screens are not suited for use in connection to other objects than in front of a TV or monitor view screen, and normally it is therefore not possible to prevent radiation from the entire object or from apparatus chassis and casings etc.

There are also adhesive foils or tapes adapted to be applied directly to the viewing screen of the TV apparatus of the monitor and which tapes or foils may include particles or any other material that is considered to reduce the radiation. The radiation reducing effect often is low, and the foil can easily be damaged, for instance scored, and it may be difficult and expensive to repair the damage. Often it can also be difficult to release the foil for exchanging same. In many cases it may be necessary to use a chemical substance, and there is a risk that such substances enter the apparatus thereby damaging same.

There are also on the market TV and monitor tubes which are, during the manufacture thereof, covered with a paint which is intended to reduce the electrostatic field that is emitted from the viewing screen. Said layer of paint often has a weak effect and is sensitive to scores and to certain cleaning stuffs and solvents, and also in this case it may be difficult to repair a damage of the paint. It may also happen that the paint is dissolved when being cleaned with ordinary cleaning substances.

The present invention is intended to solve the lacks and disadvantages of known method and apparatus and to suggest a simple, cheap and practically useful method and apparatus that can be used on screens of practically any type of material, and for some embodiments, on screens of any shape, which makes it possible to quickly and easily recondition the surface without damaging the radiating surface, and which has proved to have a surprisingly high radiation reducing effect.

In a first embodiment of the invention the monitor viewing screen, or the surface of the chassis of other object to become radiation shielded, is formed with an electrically conducting current diverting means which is earth connected, and thereafter the surface is covered by a foil or a film of a clear, transparent material which is on one side covered with an electrically conducting salt solution, and which is applied to said surface with the salt layer facing and in direct contact with the current diverting means and with the viewing screen, the chassis plate etc. For making it possible to apply the foil on bulging surfaces the foil preferably is of elastic type. It is also possible to make the foil or film liquid soaking and impregnated with a fluid, especially impregnated with an electrolytic salt.

The above method normally gives a good result but it is restricted for instance in that the foil or film cannot be applied to strongly three dimensionally bulged surfaces without the risk that the film or foil becomes shrinkled etc. during the application of following long time use, and the film or foil is released by time, and that the electrically conducting salt solution by time becomes dry or pasted to the surface, so that it is difficult to remove the foil for cleaning the radiating surface, for instance the monitor viewing screen. The method also is restricted in that safe skill or expert knowledge may be needed for applying the film or foil.

In an alternative method according to the invention the viewing screen of a monitor and the current diverting means is daubed with a mass or substance containing a salt, preferably a salt of electrolytical type, which mass is of a type which when exposed to air provides a surface skin or becomes dried right through, and which in such dry state is electrically conducting. After the mass has obtained a surface skin or has dried right through the apparatus is ready for being used.

Thus the invention is based both on the observation that a very good diverting of radiation can be obtained by means of a current diverting means of special type which is applied directly in contact with the radiating surface and which is earth connected, and on the knowledge that certain chemical fluids are electrically conducting both in liquid and in dried states, and also provide a skin or a shell after having been exposed for a short while to air, and that the mass is electrically conducting also after it has dried or formed a skin or shell. By applying a diverting conductor on the radiating surface and by covering said surface with such a substance and foreseeing that the conductor and the substance are connected to earth it is possible to obtain such strong reduction of the electrostatic field adjacent the radiating surface that it is hardly possible to measure the field on a distance of about a decimeter from said surface.

Very good results have been obtained when covering the radiating surfaces with certain salt solutions of electrolytic type, which when being exposed to air become dried and provide a skin or shell on the surface, for instance sulphates of alkali metals and of the strongly electro positive metal calcium, especially ether sulphates comprising sodium lauryl ether sulphate, potassium lauryl ether sulphate and calcium lautyl ether sulphate, at the same time as a radiation diverter applied on the surface of the viewing screen and the covering substance provided on said surface are earth connected.

In order to have the covering substance stick well to the radiating surface it may contain a adhering means like a little portion of wax particles which stick well to the radiating surface.

In some cases it is considered sufficient to earth connect the viewing screen and the covering substance only at a few points, but it may in such cases take relatively long time before the electrostatic field is fully diverted or is reduced to a reasonable degree. By providing a large number of earth connection points or a long diverting connector, preferably a continuous diverter in direct contact with the radiating surface the diverting of the field is substantially accelerated and the effect is substantially improved.

An effective and advantageous diverter can be provided in that a coil of an inert material, for instance stainless steel, is applied round the edges of the viewing screen and in contact with the viewing screen and with the covering mass, for instance stretched over plastic buttons or similar devices which are secured at the corners of the viewing screen. The coil both gives a large number of points of contact with the viewing screen and a substantially total contact with the covering of the screen, and can be stretched out and adapted to a large number of viewing screens and other surfaces of different size.

Tests have proved that a coil of suitable type, which is applied to a viewing screen and is earth connected can give a very good diverting of the electrostatic field at the viewing screen even without the use of a covering mass, but in such case the diverting of the electrostatic field takes very long time and is not really as good as the diverting when using a covering mass.

EXAMPLE 1

For judging the effect of the invention the voltage emitted from a particular viewing screen was measured at a predetermined distance in front of the viewing screen, and it was noted that said voltage was about 3,000 V. In order to apply the invention, a little plastic button was secured at each corner of the same viewing screen. Said buttons were attached as far out at the edges of the screen that the visability was not in any way disturbed. The viewing screen then was covered with a solution of sodium lauryl ether sulphate in the form of a layer which was so thin that it did not influence the visability of the screen. In the said layer of the sulphate, while still wet a coil of stainless steel was applied. Said coil had a diameter of 1 mm and was made of a wire having about 0.1 mm diameter. The coil was stretched over the plastic buttons at the corners of the viewing screen, and it was foreseen that it came into contact with both the viewing screen and with the sulphate solution. The coil was connected to an earth conduit as shown in FIGS. 1 and 2. After a couple of hours the sulphate had become dried so as to expose a skin or a surface layer, and after another couple of hours the layer was dried right through and exposed a lustreless, reflection-free surface. The viewing screen was connected and the voltage was measured at the same place as for the earlier measurement. Surprisingly is proved that the electrostatic field from the viewing screen was so faible that no voltage at all could be observed at the place of observation in front of the screen. Still after several months of use of the screen the same low voltage from the viewing screen was noted.

EXAMPLE 2

The test was repeated with two identical viewing screen apparatus, one having and the other not having a diverting conduit and not having a sodium lauryl ether sulphate, and the voltage was measured at a distance om 200 mm from the front of the viewing screen. It could be established that the viewing screen having the surface layer did not exhibit any voltage that could be measured, whereas the viewing screen not having such surface covering, exhibited a voltage which was increased during about a minute to about 3,000 V. The voltage from the two screens was kept constant for several hours. The viewing screen not having the radiation diverting means was provided with an earth connected diverting means in the form of a coil of stainless steel which was applied around the edges of a very well cleaned viewing screen. The voltage slowly decreased but did not reach as low as to less than about 1,000 V in a reasonable period of time. After a layer of sodium lauryl ether sulphate had been applied on the screen, however, the voltage immediately decreased to zero.

EXAMPLE 3

The same test as in example 1 was repeated, but the viewing screen was not provided with an earth connection means. The voltage from the screen covered with the sulphate mass was, from the beginning, about 1,500 V but decreased within the course of about ten minutes to about 1,000 V, at what level the voltage was kept constant for several hours.

EXAMPLE 4

The same test as in example 1 was repeated with the difference that the viewing screen was formed with a short earth connector applied only at one corner of the screen. When the screen was connected the voltage was about 800 V but decreased during the course of about ten minutes to nearly zero.

EXAMPLE 5A AND 5B

The same tests were made as in example 1 but each with a covering comprising potassium lautyl ether sulphate and litium lauryl ether sulphate respectively. The same good results were obtained as in example 1.

EXAMPLE 6

Several further tests were made with masses based on an acid and being of a type which is electrically conducting after the masses had become dried. Nearly as good results as in the above described examples were obtained.

EXAMPLE 7

Various tests were made with the same type of earth connected diverting means as in the above examples, but the diverting coil was shortened to $\frac{3}{4}$, $\frac{1}{2}$ and $\frac{1}{4}$ respectively of the circumference of the viewing screen at the outer edges thereof. The tests proved, as expected, that the effect was decreasing when the coil was shortened. Acceptable results were obtained with such shortened coils, but the best result was obtained when the coil was extended around the entire viewing screen.

The method and the apparatus are diagrammatically illustrated in the accompanying drawings which show a possible embodiment which is not intended to restrict the invention.

In the drawings

FIG. 1 diagrammatically shows a radiation diagram from a viewing screen.

Figure 1:
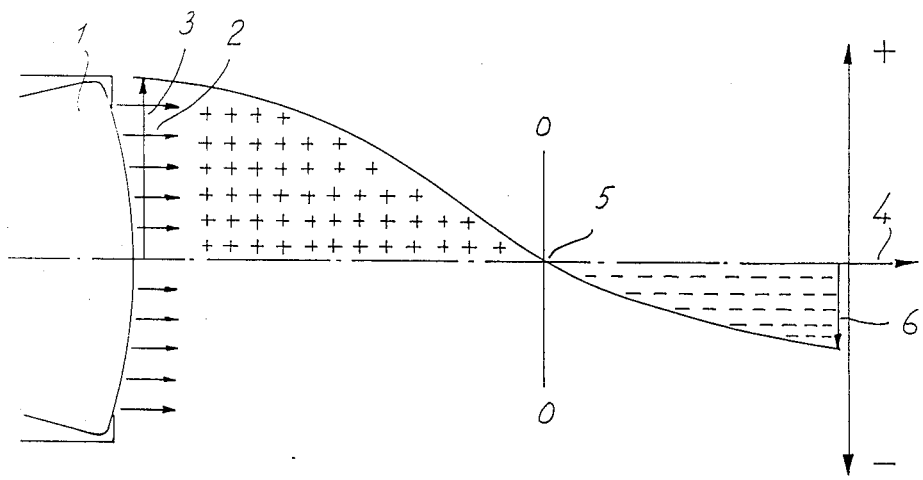

In FIG. 1 there is shown a viewing screen 1 which emits an electrostatic or electromagnetic field 2 from its front surface, which field has a positive charge of a certain voltage which is marked with the arrow 3 on the positive half of the neutral axis. The diagram shows that the voltage decreases in the direction off the screen, and that the voltage curve passes the neutral axis at the zero point 5. Following the zero point the field is transformed to a negative voltage marked with the arrow 6. By applying a protection film or foil or a protection mass according to the invention to the viewing screen 1 the voltage decreases practically to the neutral axis over the entire diagram.

Figure 2:
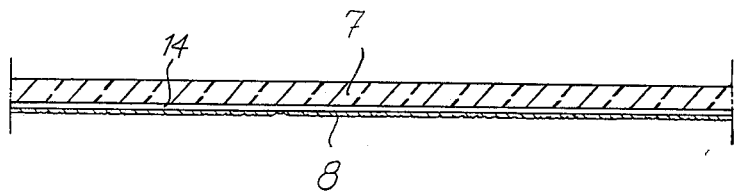
FIG. 2 shows a cross section through a foil or film according to the invention.

FIG. 2 shows a cross section through a screen foil adapted to be applied directly to the glass of the viewing screen, a copying machine, a discharge tube or any other apparatus emitting radiation. The screen foil comprises a support foil 7 which may optionally have a (not illustrated) antireflection layer on its outwards (upwards) facing surface. On the opposite side the support foil 7 carries a layer of an electrically conducting fluid 8 which is bound to the support foil by means of a thin and easily penetratable second foil of gelatin or another suitable binder. The electrically conducting fluid is adapted to come in direct contact both with a not illustrated electrical diverting means and with the surface of the viewing screen when the foil or film is applied to the viewing screen.

When using the screen foil according to FIG. 2 one or more electrically conducting current diverting devices is/are first applied in direct contact with the viewing screen, for instance several small pieces of metal foil, which means are earth connected. Then the screen foil or film is applied with the fluid layer 8 in contact with the surface of the object to become radiation inhibited and in contact with the current diverting means, and manually or by means of a suitable tool the foil or film is pressed to the surfaces of the object and the current diverters, so that the electrically conducting fluid is released and is spread evenly and thinly over the entire surface. After all air bubbles have been pressed out the foil or film is kept on the surface. Eventually the fluid 8 may have a slight addition of a transparent adhesive substance for further improving the adhesion of the foil to the surface of the object and to the current diverters.

Figure 3:
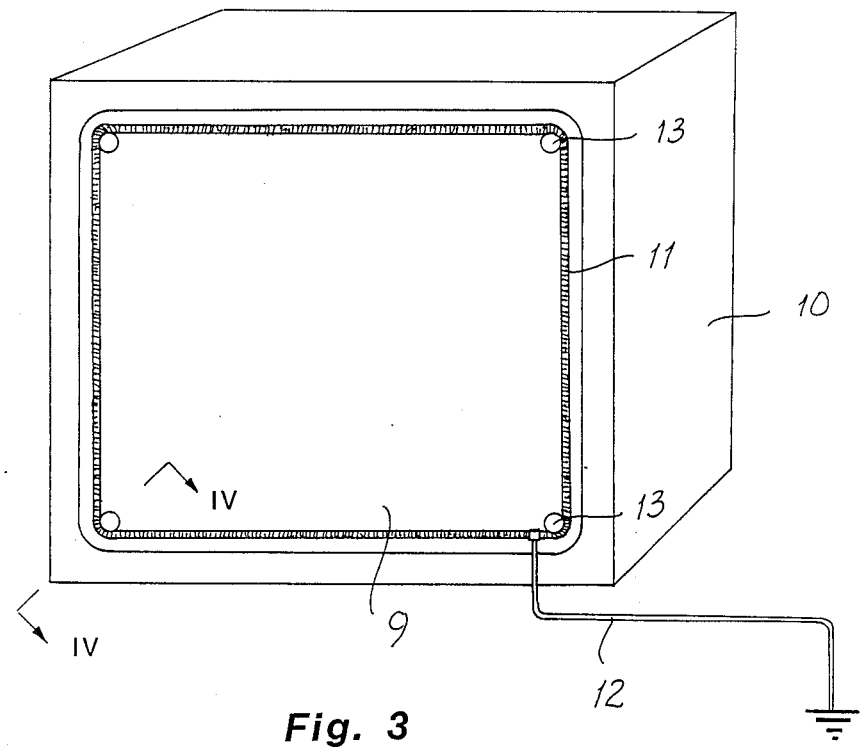
FIG. 3 shows an alternative method according to the invention applied to a viewing screen.
Figure 4:
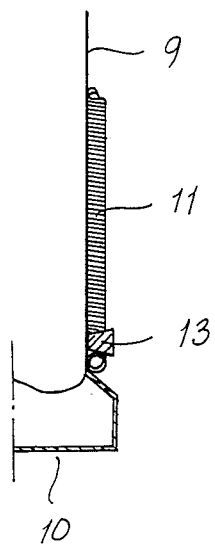
FIG. 4 shows a little part of the apparatus of FIG. 3.

In FIGS. 3 and 4 is shown how the radiation from a viewing screen 9 of a TV set or a computer monitor 10 can be diverted. This is made in that an earth diverting means 11 is attached in direct contact with the radiating surface, in this case the viewing screen 9. The diverting means can be an electrically conducting tape, an electrically conducting strip of paint or a similar means, but in a preferred embodiment of the invention said diverging means is a metal coil, in particular a metal like stainless steel which is chemically resistent. The coil is preferably wound relatively close-lapped both for giving a large number of close points of contact with the viewing screen and also for making it possible to use one and the same coil for viewing screens of different size with the coil more or less extended. The coil may in the factory have been assembled to an endless coil ring, or it may at the place of mounting the coil be cut to a suitable length and be connected to a coil ring in connection to mounting of the coil on the viewing screen. For the sake of clearness the coil is shown in a substantially exaggerated size in FIG. 3. In different tests coils of different wire sizes and winding diameters have proved to be a fairly like result, and therefore it is recommended to use coils having relatively small dimensions. In a suitable case a coil was wound of a stainless steel wire having a diameter of 0.1 mm to a coil having a diameter of 1 mm. As conventional the coil was formed with a connection for an earth conduit 12.

The coil is mounted on radiating object by means of a mounting means like buttons or holders 13 of a conducting or non-conducting material and formed tapering inwards to the viewer screen and which are attached, for instance glue connected on suitable places of the viewer screen, preferably at the corners thereof and outside the picture surface of the screen, so that the coil does not disturb the picture. The diverting coil 11 is stretched over said buttons 13 so that the coil gets intimate contact with the viewer screen surface at a large number of points.

It should be pointed out that it is possible to use one or more small points of contact for the earth connection purpose, but this may lead to the effect that the voltage from the screen is reduced far too slowly after the apparatus has been connected and that a less good reduction of the radiation is obtained than while using an all around the screen extending coil. Therefore it is recommended to use an all around the screen extending coil.

After the coil has been mounted the viewing screen surface 9 and the coil 11 is covered with a paste or a mass containing salts of electrolytic type, and which paste or mass is adapted to become dried and form a shell when exposed to air, and which is electrically conduiting also in such dried state. For practical reasons the covering mass ought to be of non-toxic and non-allergenic type. The above mentioned masses seem to fulfil also such demands. The covering is made in a layer which is thin enough not to disturb the visability of the screen, for instance in a layer having a thickness of 0.2–1.0 mm. Tests with layers having different thickness have proved that the voltage decreases quicker when using thick layers than when using thin layers, but the same good radiation reduction is obtained within certain limits. It is important that the mass has a good contact both with the viewing screen surface 9 and with the diverting coil 11. The earth connector 12 is connected to earth, and when the covering has become dried, what takes from some few minutes to about an hour, the apparatus is ready for being used without the risk that dust particles stick to the mass.

Tests have proved that the apparatus keeps its good radiation reducing properties for at least some months. It has not yet been possible to check the said properties for a longer period of time than that.

The covering can easily be removed by means of a suitable solvent if it should be wanted to recondition the covering, and new buttons 13, a new coil 11 and new covering mass can be applied exactly as mentioned above. A still further advantage with the invention is that it can be used for any available viewing screen and on any two dimensional or three dimensional object, and that the application can be made without expert knowledge.

We claim:

1. Method of reducing and diverting radiation from any kind of radiation emitting surfaces like viewing screens, TV screens, chassis and apparatus box etc, applying in that a layer of fluid (8) or a mass of a salt of electrolytic type in direct contact with the radiation emitting surface (1; 9), providing an electrically conducting current diverting means (11) in contact with said surface (1; 9) and in intimate contact with said layer of fluid (8) or mass, before or after the said layer or mass is applied to the radiation emitting surface.

2. Method according to claim 1, characterized in that the layer of fluid (8) is an electrically conducting layer facing the radiation emitting surface and provided on a clear, transparent carrier film (7), which conducting layer is impregnated in the carrier film or is bound to said film by means of an easily penetrable foil, a layer of gelatin or a similar material, and which is penetrated when the foil is applied to the radiation emitting surface, so that the electrically conducting gelatin comes in direction and full contact with radiation emitting surface and with the current diverting means.

3. Method according to claim 1, characterized in that the was electrolytic salt is of the type which, when exposed to air, forms a surface skin is dried right through, and which even in dried state is electrically conducting.

4. Method according to claim 1 characterized in that carriers, for instance carrier buttons (13) are attached to the surface of the radiation emitting apparatus (9), especially at or close to the corners of said surface, and in that the electric current diverting means having an earth connecting means (12), preferably in the form of a coil (11), is put over said buttons (13), whereupon the electrolytic covering mass is applied.

5. Method according to claim 4 characterized in that the fluid layer or the covering mass is a salt of an acid, for instance a sulphate of an alkali metal like sodium lauryl ether sulphate or potassium lauryl ether sulphate, or of calcium, like calcium lauryl ether sulphate.

6. Method according to claim 5 characterized in that an adhesive substance is admixed in the fluid layer or the covering mass, for instance a wax in finely dispersed or melted form.

7. Apparatus for diverting of electrostatic radiation from radiation emitting surfaces like viewing screens, apparatus chassis etc. characterized in that the apparatus comprises an electric current diverting means (11) having an earth connecting means (12) adapted to be attached in intimate conducting contact with the radiation emitting surface (1; 9) and adapted to be earth connected, and a fluid layer (8) or a covering mass comprising or consisting of a salt of electrolytic type which is applied over and in intimate contact with the electric current diverting means (11) and with the radiation emitting surface (1; 9).

8. Apparatus according to claim 7, characterized in that the fluid layer (8) is an electrically conducting layer facing the radiation emitting surface and impregnated in a clear, transparent carrier film (7), or bound to the carrier film (7) by means of an easily penetratable foil, a gelatin layer or a similar material, which is penetrated when the foil with the fluid layer is applied to the radiation emitting surface, so that the electrically conducting fluid comes in direct and full contact with the radiation emitting surface and with the current diverting means.

9. Apparatus according to claim 7, characterized in that the mass comprises or contains an electrolytic salt of a type which is adapted to form a surface skin or to become dried in contact with the air, and which is electrically conducting even after having become dried.

10. Apparatus according to claim 9 characterized in that the fluid layer or covering mass is a salt of an acid, in particular a salt of an acid and an alkali metal or of calcium, for instance a sulphate, especially sodium lauryl ether sulphate, potassium lauryl ether sulphate or calcium lauryl ether sulphate.

11. Apparatus according to claim 10 characterized in that the electric current diverting means (11) is endless and is adapted to be applied round the entire radiation emitting surface (9) adjacent the edges thereof.

12. Apparatus according to claim 11 characterized in that the electric current diverting means is a coil (11) of a conducting material, especially a material, like stainless steel, which is inert to chemicals, and in that the electric current diverting means is adapted to be mounted on the radiation emitting surface (9) by being stretched over buttons or similar means (13) which are attached to the said surface (9), and is adapted to be covered by the film applied to the radiation emitting surface.

13. In combination with a video screen having a normal viewing surface area, an electrostatic radiation diverting apparatus comprising; an electrolytic layer applied to the video screen viewing area, and electrically conductive element extending around a substantial portion of the periphery of the viewing area and an electrically conductive contact with said electrolytic area, and electrical grounding means for said conductive element to discharge any static electrical charge from the video screen viewing area through said electrolytic area to said conductive element.

14. The combination of claim 13 wherein said electrolytic layer comprises a transparent carrier film and an electrically conductive salt.

15. The combination of claim 14 wherein said electrically conductive element comprises a wound stainless steel coil having closely spaced turns that are provided in contact with the normal viewing surface area of the video screen and also in contact with the electrolytic layer.

* * * * *

UNITED STATES PATENT AND TRADEMARK OFFICE
CERTIFICATE OF CORRECTION

PATENT NO. : 4,856,101

DATED : August 8, 1989

INVENTOR(S) : Sven Jonsson and Anders Hagman

It is certified that error appears in the above-identified patent and that said Letters Patent is hereby corrected as shown below:

Col. 7, line 23, "was" should be --mass of--.

Signed and Sealed this

Ninth Day of October, 1990

Attest:

HARRY F. MANBECK, JR.

*Attesting Officer*   *Commissioner of Patents and Trademarks*